(12) United States Patent
Rogers et al.

(10) Patent No.: US 10,614,242 B2
(45) Date of Patent: Apr. 7, 2020

(54) SYSTEM AND METHOD FOR SECURE QUERY PROCESSING FOR PRIVATE DATA NETWORKS

(71) Applicant: Northwestern University, Evanston, IL (US)

(72) Inventors: Jennie Marie Rogers, Evanston, IL (US); Abel Kho, Chicago, IL (US)

(73) Assignee: Northwestern University, Evanston, IL (US)

( * ) Notice: Subject to any disclaimer, the term of this patent is extended or adjusted under 35 U.S.C. 154(b) by 155 days.

(21) Appl. No.: 15/714,383

(22) Filed: Sep. 25, 2017

(65) Prior Publication Data

US 2018/0096166 A1 Apr. 5, 2018

Related U.S. Application Data

(60) Provisional application No. 62/402,361, filed on Sep. 30, 2016.

(51) Int. Cl.
| | | |
|---|---|---|
| *H04W 12/02* | (2009.01) | |
| *G06F 21/72* | (2013.01) | |
| *G06F 21/60* | (2013.01) | |
| *G06F 21/62* | (2013.01) | |
| *G06F 16/951* | (2019.01) | |
| *H04L 29/06* | (2006.01) | |

(52) U.S. Cl.
CPC ........ *G06F 21/6245* (2013.01); *G06F 16/951* (2019.01); *G06F 21/72* (2013.01); *H04L 63/04* (2013.01); *H04W 12/02* (2013.01); *G06F 21/602* (2013.01); *H04L 2209/16* (2013.01); *H04L 2209/46* (2013.01); *H04L 2209/50* (2013.01)

(58) Field of Classification Search
CPC ............. H04L 63/0428; H04L 63/0281; H04L 63/0414; H04L 63/04; H04L 2209/16; H04L 2209/46; H04L 2209/50; G06F 16/951; G06F 21/6245; G06F 21/72; G06F 21/602; H04W 12/02
See application file for complete search history.

(56) References Cited

PUBLICATIONS

Kohntopp, SQL: What is a tuple?, https://www.quora.com/SQL-What-is-a-tuple, 2016. (Year: 2016).*
Bellare et al. "Foundations of Garbled Circuits", Cryptology ePrint Archive, 2012, available at https://eprint.iacr.org/2012/265.pdf (Year: 2012).*
Lu et al., How to Garble RAM Programs? Advances in Cryptology. EUROCRYPT 2013. Lecture Notes in Computer Science, vol. 7881 (Year: 2013).*
C. Liu, X. S. Wang, K. Nayak, Y. Huang and E. Shi, "ObliVM: A Programming Framework for Secure Computation," 2015 IEEE Symposium on Security and Privacy, San Jose, CA, 2015, pp. 359-376. (Year: 2015).*
Bater, Johes, et al.; "SMCQL: Secure Querying for Federated Databases," Mar. 6, 2017; 13 pages.

* cited by examiner

*Primary Examiner* — Alexander Lagor
*Assistant Examiner* — Howard H. Louie
(74) *Attorney, Agent, or Firm* — Benesch, Friedlander, Coplan & Aronoff LLP

(57) ABSTRACT

Systems and methods enable two or more data providers that do not trust each other with their data to pool their data for analysis. The systems and methods can translate conventional database SQL queries into secure multiparty computation so that the data providers can analyze their collective data without requiring any of them to disclose private information.

20 Claims, 5 Drawing Sheets

(a) Comorbidity   (b) Recurrent C. Diff   (c) Aspirin Count

SYSTEM AND METHOD FOR SECURE QUERY PROCESSING FOR PRIVATE DATA NETWORKS

CROSS-REFERENCE TO RELATED APPLICATIONS

This patent application claims the benefit of U.S. Provisional Patent Application No. 62/402,361, filed on Sep. 30, 2016, the entire contents of which is incorporated by reference in its entirety.

BACKGROUND

Traditionally, individuals and companies can pool data by having each data owner upload their data to a neutral, third-party surrogate or honest broker. This solution may be unsatisfying because the honest broker may potentially be compromised.

DESCRIPTION

The systems and methods describe secure databases, secure multiparty computation, and/or secure enclaves. In some implementations, the systems and methods can generalize federated databases to contexts where users may mine sensitive data by only revealing the output of a query. In one example, the secure databases can be used in clinical data research networks and other settings in which users who do not trust one another want to pool their data for analysis, e.g., to permit large sets of queries. In some implementations, the systems and methods can create secure computation among data providers, making a broker only responsible for assembling encrypted shares of the results of computation over the collective data of two or more data providers. Other applications for the secure databases include, but are not limited to, enabling financial institutions to comply with regulators researching transactions over multiple organizations, supporting non-profit organizations that work in human rights by allowing them to keep their data private, increasing the resell value of information in data markets, etc.

Figure 1:
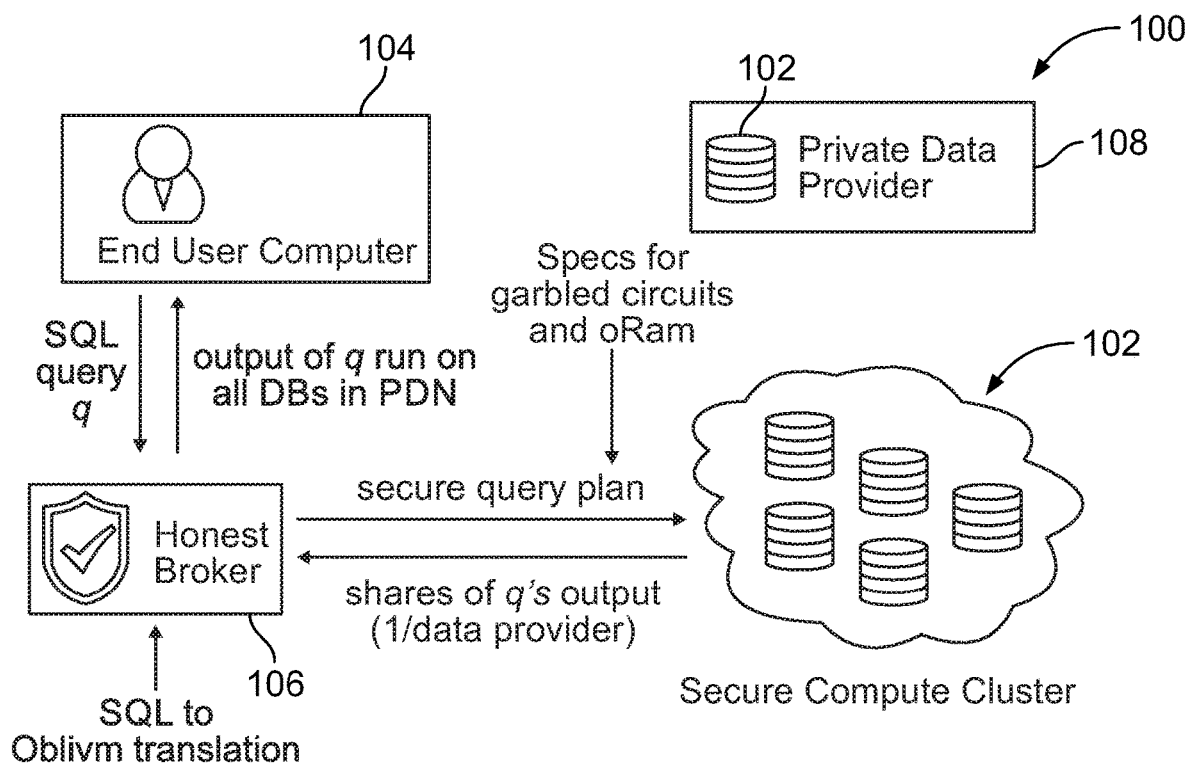
FIG. 1 is a block diagram of an example private data network.

FIG. 1 is a block diagram of an example private data network (PDN) 100. Despite an abundance of collected data, progress has been slow in sharing data for open science, business, and other data-intensive endeavors. Efforts can be stymied by privacy concerns and regulatory compliance issues. For example, many hospitals are interested in pooling their medical records for research, but the hospitals do not want to disclose arbitrary patient records to researchers or other healthcare providers. In this, and other data sharing environments, the PDN 100 can provide a federated database for querying over collective data of mutually distrustful data providers 108. In the PDN 100, each member database 102 does not reveal its records to its peers nor to the query writer. Instead, a user computer 104 submits a query to an honest broker 106 that plans and coordinates its execution over the multiple private databases 102 using secure multi-party computation (SMC). The databases 102 can include publically available data and private data. In the healthcare example, public data includes, but is not limited to, patient identification numbers. Private data includes, but is not limited to, information about patient sex, diagnosis information, etc. Each database's 102 query execution is oblivious, and its program counters and memory traces are agnostic to the inputs of others.

In some examples, a framework for executing PDN queries is referred to as smcql. The PDN 100 translates SQL statements into SMC primitives to compute query results over the union of its source databases 102 without revealing sensitive information about individual tuples to peer data providers or the honest broker 106. Only the honest broker 106 and the user computer 104 receive the results of a PDN query. In other examples, for fast, secure query evaluation, a rule-based optimizer can minimize the PDN's 100 use of secure computation and partitions its query evaluation into scalable slices. An example of a rule in this context is one that determines if a step in a query plan is uses sensitive data. If it does, the rule marks it for secure evaluation.

Federated database systems can include many autonomous databases that are united to appear as a single engine for querying. Many federation databases contain data owned by mutually distrustful data providers 108 who are willing to have the union of their data analyzed, but will not disclose their raw tuples. A database federation that spans mutually distrustful sources can be include in the PDN 100. Federation databases of this kind can contain data that is privately held and not available for upload to the cloud. The PDN 100 can be used for various fields, including but not limited to, medicine, data markets, banking, online advertising, and human rights work, etc. Typically, PDN members either upload their data to a trusted intermediary or they use one-off privacy-preserving algorithms to mine it. In some examples, PDNs 100 can provide broader adoption if the user computers 104 express the analytics as declarative SQL statements.

For purposes of explanation, in some examples, a consortium of hospitals may be interested in pooling their patient records for clinical data research and each site is in charge of securing their own data. A university researcher, operating independently of the hospitals, wants to evaluate a new treatment for rare disease X. Her first step is to ask if there is a large enough cohort of X sufferers in the consortium to form a study. She writes "SELECT COUNT(DISTINCT patient_id) FROM diagnosis WHERE diag=X;" to the consortium coordinator. If this query were run in a standard database federation, the coordinator would collect and merge patient IDs for X from each site, eliminate duplicates, and counts them. This approach can be undesirable because it reveals the patient IDs of individuals affected by X to the coordinator. The PDN 100 can enable researchers to execute distributed queries without exposing information to unauthorized data providers 108 about their source data or intermediate results.

In some examples, with regard to the PDN 100 in FIG. 1, the user computer 104 submits the query to the federation's honest broker 106. The honest broker 106 can include a neutral third party that plans and orchestrates its execution over two or more private data providers 108. The federation can have a shared schema that is supported by all data providers 108. The execution of a PDN query is distributed over a secure compute cluster of databases 102 for the private data providers 108. Each database 102 of the private data provider 108 executes a secure protocol provided by the honest broker 106 that produces a share of the query output. The honest broker 106 assembles the shares into output tuples and sends them to the end user computer 104. From the user computer 104 perspective, the PDN 100 behaves like a federated database where it submits SQL and receives query results. In the example above, the end user computer 104 can include the computing device of a researcher, the hospitals are private data providers 108, and the honest broker 106 is the consortium coordinator.

The PDN 100 can include a shared set of table definitions. This schema is annotated with the level of protection for each of its attributes. For identifiers that span multiple data providers 108, such as patient IDs that appear in multiple hospitals, the honest broker 106 works with the data providers 108 to carry out secure record linkage. smcql is an example framework for planning and executing PDN queries. Other frameworks can be used depending on an implementation. smcql uses secure multiparty computation (SMC) to evaluate distributed queries among mutually distrustful data providers 108. SMC is a subfield of cryptography where two or more data providers 108 compute a function over their data while each keeps their individual inputs private. SMC makes query evaluation oblivious such that each data providers 108 computation is independent of the inputs of others.

An example of secure function evaluation is Yao's Millionaire Problem. He asked, "If Alice and Bob are millionaires who are interested in determining which one of them is richer, how can they solve for this without either party revealing their net worth?" SMC provides a black box within which the mutually distrustful data providers 108 combine their sensitive tuples for query evaluation.

Figure 2:
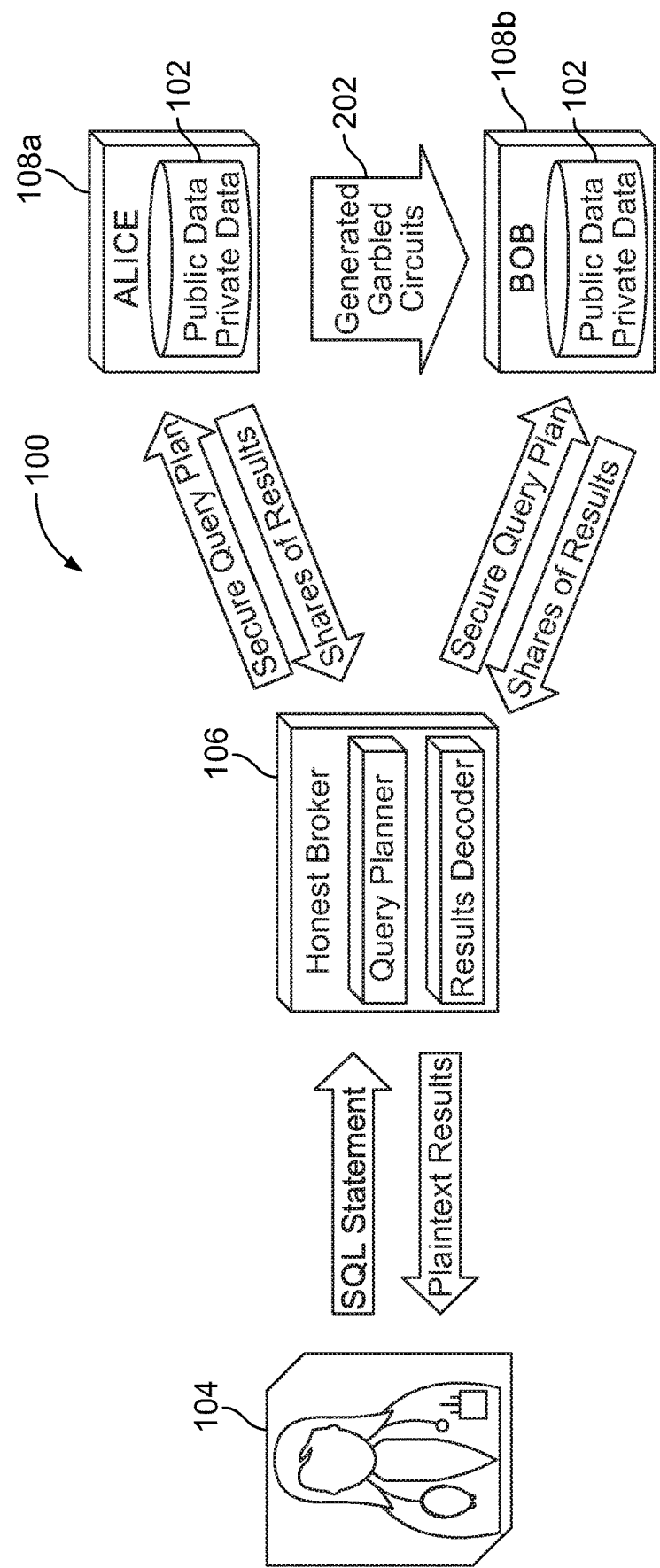
FIG. 2 is a block diagram of an example architecture of a two-party private data network.

FIG. 2 is a block diagram of an example PDN 100 architecture of a two-party private data network. The PDN 100 architecture within which SMCQL run queries are introduced over mutually distrustful data providers 108. The honest broker 106 is the entry and exit point of the PDN 100, and it can include a trusted, neutral federator that plans and coordinates query evaluation over its data providers. In FIG. 2, Alice and Bob represent the two untrusting data providers 108a, b in the PDN 100. After receiving a plaintext query from the user computer 104, the honest broker 106 rewrites it into a secure query plan. This query plan can include a series of plaintext and secure execution steps that, when taken together, compute a given SQL statement.

To set up the PDN 100, the data providers begin with a shared set of table definitions. This schema is annotated with the level of protection required for each attribute in the tables. In addition, the configuration denotes whether a table is replicated or partitioned among members. For matching identifiers, such as patient IDs in HealthLNK, the honest broker 106 works with the data providers 108a, b to carry out secure record linkage.

A PDN query execution can begin when the user computer 104 submits a SQL statement to the honest broker 106. The honest broker 106 uses a regular database with the PDN's table definitions to compile the SQL statement into a set of steps to be executed either in plaintext in the member databases or among PDN data providers 108a, b using SMC. Once this query plan is generated, the honest broker sends a copy of it to both Alice 108a and Bob 108b. For each secure step Alice 108a generates the secure functions 202 needed for its computation, and she passes them to Bob 108b for evaluation. In some examples, the secure function includes a garbled circuit. The secure functions can include any protocol that enables two or more mistrusting data providers 108 to evaluate a function over their private inputs without the presence of a trusted third party. After Alice 108a and Bob 108b finish computing all steps in the plan, Alice 108a and Bob 108b return their respective secure function 202 outputs to the honest broker 106, which combines them to reveal the plaintext query results. The honest broker 106 then sends this output to the user computer 104.

For the sake of explanation, in some examples, Alice 108a and Bob 108b are two healthcare sites, each containing a database with protected health information (PHI) and other data that does not require protection. The honest broker 106 is a trusted coordinator that takes a plaintext query from the user, rewrites it into a SMCQL query plan, and passes that query plan to two or more hospitals, e.g. Alice 108a and Bob 108b. Alice 108a and Bob 108b generate and evaluate secure functions 202, which are then returned to the honest broker 106. The honest broker 106 combines the result shares to reveal the plaintext results that it sends to the user computer 104. This PDN 100 architecture distributes the computation among Alice 108a and Bob 108b, decreasing the maximum load on any one hospital in the network.

In some examples, the PDN 100 translates database operators within a query execution plan into SMC primitives. It carefully manages its use of SMC so that its queries run efficiently. The query planner first identifies when SMC is needed in a query by modeling the flow of sensitive data through its operator tree. After that, it optimizes the subtree's execution using heuristics. smcql offers an honest-but-curious threat model. In other words, each data provider 108 is trusted to faithfully execute the protocol provided by the honest broker 106. If participants attempt to deduce the sensitive data of others during a secure query execution using side channels including program counters and memory accesses, differential privacy can inject controlled levels of noise into the data at query time to obscure the role of an individual in a larger dataset.

Therefore, the PDN 100 can provide a rule-based approach to protecting sensitive data that returns precise query results. The PDN's 100 stakeholders create a policy defining the queries they admit for execution. This policy may stipulate a minimum number of data providers 108 that participate in each secure computation or attributes that are never accessible to end users in plaintext. For example, when hospitals share health records, they typically protect patient privacy with the heuristics of HIPAA Safe Harbor.

With a combination of rules and external incentives (e.g., legal remedies for bad actors), the PDN 100 can make a large set of data available for sharing. If user computers 104 wish to add rigorous tuple-level privacy to their SQL workflow, they may integrate differentially private querying into a PDN, e.g., using techniques described in F. D. McSherry, "Privacy integrated queries: an extensible platform for privacy-preserving data analysis," published in 2009 ACM SIGMOD, pages 19-30.

smcql is a substantial departure from existing secure databases. Prior work used homomorphic encryption for the outsourced storage and querying of private data. The PDN 100 keeps data in the hands its originating data providers 108 and uses SMC to conceal the query's computation rather than the data itself. The PDN 100 distributes secure computation among the data providers and removes the need for any trusted intermediaries beyond a lightweight honest broker 106 for coordinating query evaluation. PDN 100 does not require the programmer to reason explicitly about how to combine the data of each party. Instead PDN 100 uses SQL's semantics to translate queries into SMC. PDN 100 can decouple the security policy from the querier, e.g., end user computer 104, by providing the honest broker 106 with a schema-based security policy at startup.

smcql can leverage existing SMC primitives for secure query evaluation. SMC systems allow data providers 108 to jointly compute functions while keeping each party's inputs secret. In PDNs 100, database operators act as secure functions that are evaluated over the sensitive data of two or more data providers 108. In some examples, smcql performs secure computation using secure functions 202, and conceals its access patterns of sensitive tuples with oblivious random access memory (ORAM).

The PDN 100 can use secure functions 202 to compute database operators over the data of multiple data providers 108. The secure functions 202 can include a series of logic gates (e.g., AND, XOR) that hide the program traces of their computation. The secure functions 202 use the same distribution of execution time, regardless of their inputs, to make it impossible for a party to deduce the inputs of others. In some examples, the only information available to the data providers 108 is the number of tuples provided by each party. Secure functions 202 are expressive, and can be used to compute any arbitrary function. The PDN 100 architecture can be been extended from two data providers 108 to three or more data providers 108.

Each secure function 202 securely computes a function, e.g., a≥b in Yao's Millionaire Problem. In order to not reveal the inputs of Alice 108*a* and Bob 108*b*, the PDN 100 executes the entire secure function 202 in the worst-case performance scenario. If the PDN 100 were computing a≥b in plaintext, the most significant bit where Alice 108*a* and Bob's 108*b* inputs differ is determined and used to determine the output. The secure function 202 compares all of the bits in order to not disclose the most significant one where the inputs differed. In smcql, the first data provider, Alice 108*a*, can generate the secure functions, and the second one, Bob 108*b*, can evaluate them.

In addition to covering the compute traces effected by the input of another party, the PDN 100 engine can hide the memory access patterns of a secure program. The PDN 100 can use oblivious RAM (ORAM) to store arrays of tuples as they move through the secure query executor. This data structure shuffles the tuple array at each read or write, thereby making all memory accesses indistinguishable from one another. This prevents attackers from using reads and writes in a secure program to learn about the underlying data. ORAM enables us to reduce the depth of the secure functions 202 by creating a small circuit for each database operator and securely passing the output of one operator to the next through oblivious reads rather than evaluating the query in a single, massive circuit.

HealthLNK Running Example

In some examples, a group of hospitals wish to mine the collective data of their electronic health record systems for research while keeping individual tuples private. A clinical data research network (CDRN) is a consortium of healthcare sites that agree to share their data for research. CDRN data providers may be mutually distrustful data providers 108. This repository contains records from seven Chicago-area healthcare institutions, each with their own member hospitals, from 2006 to 2012, totaling about 6 million records. The data set is selected from a diverse set of hospitals, including academic medical centers, large county hospitals, and local community health centers.

HealthLNK is the forerunner for the Chicago Area Patient-Centered Outcomes Research Network (CAPriCORN), which is itself part of a national network in the US, the Patient-Centered Outcome Research Network (PCORnet). The CAPriCORN consortium includes 481 data sources, each of which has protected health information (PHI) such as gender, timestamps, and diagnoses. CAPriCORN and HealthLNK share the majority of their stakeholders and this group designed these systems to meet the needs of clinical researchers, especially ones exploring personalized medicine.

In the absence of a secure query evaluation framework like smcql, CDRN members resort to computing distributed queries entirely within the honest broker 106. Because each data provider 108 is in charge of their own HIPAA compliance, they often only volunteer their least sensitive database attributes for querying. Although each site will not disclose its PHI, they are willing to compute queries over sensitive data when multiple records are accessed together. In addition to limiting the query-able attributes in a CDRN, this hub-and-spoke architecture does not scale to hundreds of data providers. This can be an issue seen in the field. On the other hand, this setting makes it is possible for individual tuples to hide in the crowd of the data from many participating healthcare sites. This makes CDRNs a prime use case for smcql and the PDN 100.

Query Workload

Comorbidity *Clostridium difficile*, or c. diff, is an infection that is often antibiotic-resistant. In some examples, a first query can find the most common types of ailments that arise for c. diff sufferers:

```
SELECT diag, COUNT(*) cnt
FROM diagnoses
WHERE patient_id IN cdiff_cohort
GROUP BY diag
ORDER BY cnt
LIMIT 10;
```

The query selects the diagnoses of individuals in the c. diff cohort and counts the diagnoses for each condition, returning the most common ones to the user. With comorbidity, techniques can be used for minimizing the use of SMC in distributed query evaluation.

Recurrent C. Diff C. diff sufferers have a high rate of re-infection after treatment. When patients are treated at multiple hospitals, recurrent c. diff frequently goes undetected. This is exactly the type of problem that smcql is designed to solve. This query identifies a cohort of recurrent c. diff patients whose second infection occurs between 15 and 56 days after an initial diagnosis:

```
WITH rcd AS (
    SELECT pid, time, row_no( ) OVER
    (PARTITION BY pid ORDER BY time)
    FROM diagnosis
    WHERE diag=cdiff)
SELECT DISTINCT pid
FROM rcd r1 JOIN rcd r2 ON r1.pid = r2.pid
WHERE r2.time - r1.time >= 15 DAYS
    AND r2.time - r1.time <= 56 DAYS
    AND r2.row_no = r1.row_no + 1;
```

The query can first select for c. diff, and use a window aggregate to number the diagnoses of each patient in chronological order. The query can then compare the ith diagnoses to the (i+1)th one using a self-join to find recurring infections in the prescribed date range. Lastly, the query eliminates duplicate patient IDs. The query to examine how fine-grained data partitioning (by patient ID) improves smcql's performance.

Aspirin Count In the final query, identifies the number of heart disease sufferers who were prescribed Aspirin. Researchers are investigating the effectiveness of Aspirin in preventing repeated heart attacks. The query can calculate the Aspirin Count of heart disease patients as:

```
SELECT COUNT(DISTINCT pid)
FROM diagnosis d JOIN medication m ON d.pid = m.pid
WHERE d.diag = hd AND m.med = aspirin
    AND d.time <= m.time;
```

The query first filters the diagnosis table for heart disease patients and the medications for Aspirin. It then joins these tables to identify patients who were prescribed Aspirin during or after a heart disease diagnosis. Lastly, the query counts the distinct patient IDs that meet this criterion. The query tests the smcql optimizer's ability to create high-performance query plans for complex sequences of operators.

Figure 3:
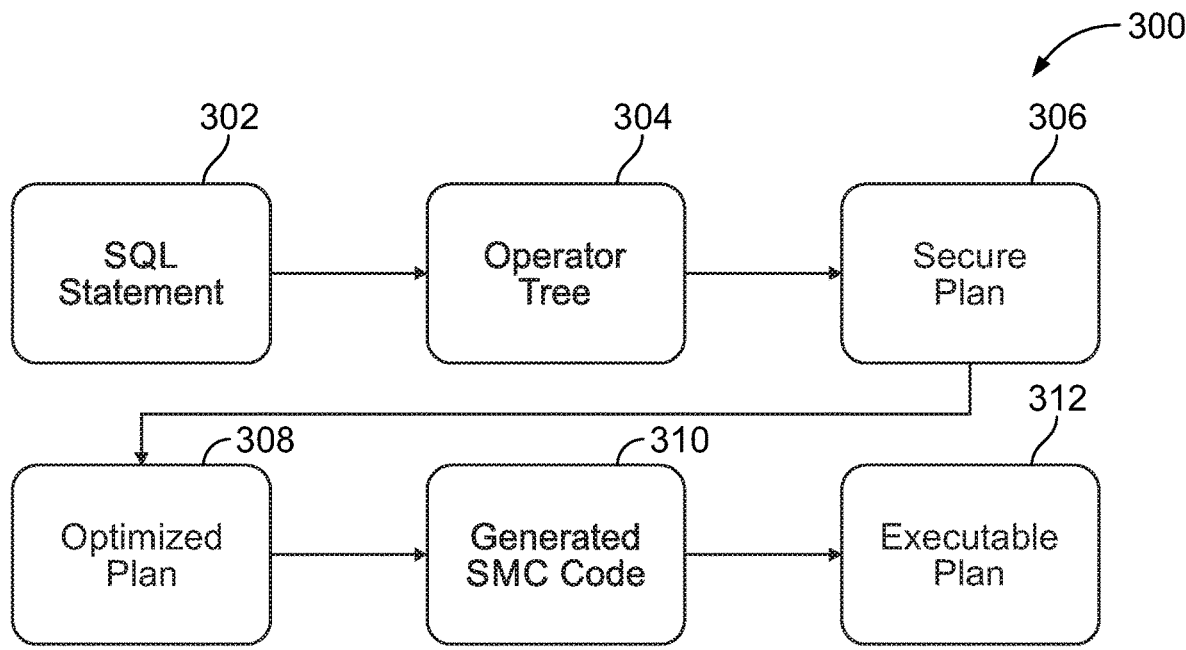
FIG. 3 is a flow diagram of example steps in SMCQL query compilation and execution.

FIG. 3 is a flow diagram 300 of example steps in smcql query compilation and execution, e.g., the steps smcql takes to translate a SQL statement into a secure query execution plan. The honest broker 106 starts with a SQL statement provided by the user (302). The statement is written against the PDN's 100 shared schema. The honest broker 106 can parse the SQL statement into a directed acyclic graph (DAG). The DAG of operators provides a set of discrete instructions for how to execute the SQL statement. The tree of database operators, such as joins and aggregates, provides the steps needed to compute a given query (304). The honest broker 106 examines the tree, confirming that it is runnable within the PDN's 100 security policy.

Next, smcql generates a secure plan that identifies the minimal subtree in the query's DAG that executes obliviously to uphold the PDN's security policy, e.g., as described in more detail below (306). The planner traverses the tree bottom-up, modeling the flow of sensitive attributes through its nodes. Next, as described in more detail below, smcql optimizes the secure query tree using heuristics that partition database operators into small, scalable units of secure computation (308). Also described in more detail below is ways for reducing the secure computation performed within an operator.

Armed with a tree of optimized operator specifications, the planner generates SMC code for execution on the data providers (310). For each relational algebra operator, the code generator looks up a template for it and populates this outline with query-specific information including the width of its tuples in bits and filter predicates. When the code generator completes there is an executable secure plan (312). The honest broker 106 distributes the compiled secure code to the data providers, along with plaintext source queries for generating inputs for SMC. The data providers run their source SQL queries within their databases and coordinates with one another to generate and evaluate secure functions for the secure operators using the specifications provided by the SMC code.

End-to-end, smcql implements a wide range of SQL operators. It supports selection, projection, aggregation (including DISTINCT), limit, and some window aggregates. For joins, the smcql can handle equi-joins, thetajoins, and cross products.

Secure Query Executor smcql translates physical operators in a PDN plan into executable, secure code. The PDN 100 combines tuples from multiple data providers 108. Secure code is generated for each relational operator in the operator tree. The secure code uses the secure functions 202 to jointly compute an operator over the participating data providers 108, and can store the result in ORAM. The PDN 100 uses the secure data structure to pass intermediate results between nodes in the operator tree. The query executor carries out this secure computation—with Alice 108a generating the circuits and Bob 108b evaluating them—for every subsequent operator in the tree until it reaches the root node. Each party 108a, b ships their garbled result from the root node to the honest broker 106 for decoding the query's output tuples.

To create secure functions and ORAM for PDN query evaluation, the PDN 100 can use a domain-specific programming language, ObliVM. This language has a C-style syntax. Among other features, ObliVM offers callable functions, loops, and if-then statements. A programmer declares and accesses ORAM in ObliVM using the C language's bracket notation. This framework compiles its code in two steps. First, it translates the code into a set of logic gates and ORAM accesses. Then, at execution time, it generates the secure functions on the fly to prevent replay attacks. This language is backend-agnostic, so if one were to research new secure function protocols, they would be able to seamlessly compile them into the code generated by smcql.

Each secure operator starts with a template, or a parameterized C-style program for the operator's execution logic. Templates have variables for filter predicates, input tuple widths, and for projecting their output as needed. The system has a library of operator-specific templates, including ones for the optimizations.

An example template for joins is shown below. The template's parameters are denoted with a "$". The PDN 100 populates the template's variables using parameters from its relational query plan. This join function takes in two arrays of tuples, one for each input. Each array contains tuples from both data providers 108a, b. The variables $lSize and $rSize denote the number of bits per tuple in each input relation. The tuples per input table are stored in n and m, and the SMC executor infers these values at runtime. Template for secure join:

```
int$dSize[m*n] join(int$lSize[m] lhs, int$rSize[n] rhs) {
    int$dSize[m*n] dst;
    int dstIdx = 0;
    for(int i = 0; i < m; i=i+1) {
        int$lSize l = lhs[i];
        for(int j = 0; j < n; j=j+1) {
            int$rSize r = rhs[j];
            if($filter(l, r) == 1) {
                dst[dstIdx] = $project;
                dstIdx = dstIdx + 1;
            }
        }
    }
    return dst;
}
```

After populating an operator's template, the PDN 100 compiles it into a low-level representation with logic gates and ORAM accesses. This is the code that each data provider 108 executes. These low-level directives automatically generate all of the secure functions 202 (and their coded inputs) at runtime to protect the secure query evaluation from replay attacks.

SMC Performance Costs

SMC techniques can incur overhead in comparison to their plaintext counterparts. To get an intuition for the performance costs and optimization opportunities associated with secure query evaluation, carefully optimized, fully-SMC implementations were executed on a randomly selected subset of tuples that matched the query's initial selection criteria. To bound the duration, the input samples can have 50 tuples per table.

Example results are shown in Table 1. A purely secure query evaluation is on the order of 4-5 orders of magnitude slower than its plaintext execution. For complex plans with cascades of operators, like aspirin count, the runtime explodes. In order to keep their computation oblivious, each step in the query has an output cardinality equal to its maximum possible size. For example, the output of a join is the size of the cross product of its inputs. Thus aspirin count's aggregate after the join process all of these tuples-despite many of them being nulls—to avoid revealing information about the contents of the join inputs.

Instead of naïvely using SMC on the entire query plan, the smcql optimizer in can use SQL semantics to minimize the work performed in SMC and break this secure computation into small, scalable partitions for speedy evaluation. These optimizations are agnostic to the SMC primitives used in distributed query evaluation. A security model allows to describe optimizations and verify that the system satisfies the security requirements of its stakeholders.

TABLE 1

Slowdown of HealthLNK queries run with SMC.

| Test | Plaintext | Secure | Slowdown |
| --- | --- | --- | --- |
| Comorbidity | 158 | 253,894 | 1,609X |
| Recurrent C. Diff | 165 | 159,145 | 967X |
| Aspirin Count | 193 | 8,195,317 | 43,337X |

Security Model

An attribute-level model specifies who may access the PDN's data and under what conditions. smcql's security type system identifies the minimal set of operators in a query plan that require oblivious evaluation to protect a PDN's sensitive data.

Security Policy smcql offers a simple, yet powerful security model to protect PDN data from unauthorized access. The PDN 100 can include a set of table specifications and define the level of protection needed for their data one column at a time. This approach mirrors how PDN stakeholders often reason about the sensitivity of their data.

Some examples provide three levels of data access: public, protected, and private. By working with stakeholders, a DBA creates an annotated schema that specifies the PDN's 100 security policy. This policy also enables the smcql optimizer to create efficient, secure plans.

Public attributes are readable by alldata providers 108, including the honest broker 106, data providers 108, and end user computers 104. These columns have the lowest sensitivity, and often have a low probability of being independently replicable. In the HealthLNK example, anonymized patient IDs, lab results, and blood pressure readings are public attributes.

Protected data is visible in their originating site and conditionally available to the end user and honest broker. smcql uses k-anonymity to control access to protected attributes. A selection is k-anonymous if each of its tuples is indistinguishable in its protected attributes from at least k−1 records. This policy is one of many possibilities for controlling access to protected data. Any distributed query evaluation over these attributes is done securely. In some examples, protected attributes include diagnosis codes, age, and gender.

Private attributes are the most sensitive ones in the PDN 100, and they are not disclosed to anyone outside of the initial data provider. Computation over these attributes are carried out obliviously. Private attributes may not appear in any results returned to the user. Timestamps and zip codes are examples of private attributes in HealthLNK.

This access control policy governs when and how the PDN 100 uses secure computation. In addition, the PDN 100 is configured with a query admission policy. This policy may disallow certain patterns of querying, such as repeated, but slightly modified ones designed to unmask individuals in a database. It may also enable data providers to hide in the crowd with requirements such as "at least k data providers must contribute tuples to a secure computation." The PDN 100 may automatically reject queries that do not meet its policy, using a system such as DataLawyer. Another approach is to audit query trails to determine if a sequence of queries is threatening to unmask sensitive views of the data.

Since query processing takes place within the data providers, the PDN 100 treats protected attributes as if they are private.

Secure Information Flow

One way to optimize the PDN 100 query is to minimize the number of operators it runs securely. The PDN 100 can use a security type system to analyze the flow of secure attributes through an operator tree. The planner traverses the tree bottom-up, recording the operators that are executed obliviously to fulfill the requirements of the PDN's 100 security policy. In each operator, the PDN 100 examines the provenance of its output columns and determines the protection level needed for each one by taking the maximum security policy of its source attributes.

The security type system begins with a grammar with which the planner interprets the query's operator tree. Grammar 1 shows the syntax with which the type system analyzes a query tree to determine whether each of its database operators needs oblivious evaluation. This syntax closely follows that of relational algebra.

| ⟨phrases⟩ | ρ ::= e \| E \| Op |
| --- | --- |
| ⟨expressions⟩ | e ::= a \| n \| e + e' \| e ≤ e' \| e ∧ e' \| ... |
| ⟨sets⟩ | E ::= {e$_1$, e$_2$, ..., e$_n$} |
| ⟨operators⟩ | Op ::= Op'(Op(·)) |
|  | \| Op'(Op(·),Op(·)) \| scan(E) |
|  | \| σ$_e$(E) \| π$_{E'}$(E) \| E ⋈$_e$ E' |
|  | \| agg(E) \| limit(E) \| sort(E) |
|  | \| E ∪ E' \|E ∩ E' \| E \ E' |

Grammar 1: Grammar for SQL query plans.

All objects in a query plan are phrases, represented by ρ. A phrase may be an expression (e), a set of expressions (E), or a relational operator (Op). Expressions may describe attribute references (a), string and integer literals (n), arithmetic operators, comparisons or logical connectives.

Operators are arranged in a tree and each operator has up to two children. An operator takes in a set of expressions, E, and produces a new set, E', as output. The grammar offers table scans, filters (σ$_e$(E)), projections (π$_{E'}$(E)), joins (⋈), aggregates, sorts, limit, and set operations. ⋈

⟨security types⟩ τ ::= s ∈ {low,high}

⟨phrase types⟩ ρ ::= τ|τ set|τ exec

Grammar 2: Grammar for Secure Information Flow Analysis

The security type system assigns a label to each phrase in a query plan. To model the flow of secure attributes through the query tree, the PDN 100 can label each phrase as low or high. If a phrase is low, it does not require oblivious computing and it can be executed within the source databases like a federated query. A high phrase requires oblivious evaluation. The PDN 100 can use low to denote computing over public attributes or in a setting where secure evaluation is not needed. Private attributes are handled with high operators and the PDN 100 calls the set of high attributes in a PDN schema h. In addition to judging each phrase as low or high, the PDN 100 records the type of each phrase to show whether it is referring to an expression (the default), set of expressions, or an operator execution. This syntax is shown in Grammar 2.

For each typing rule, $$\frac{\text{assumptions}}{\text{type judgement}}$$

to denote the conditions under which to assign a security label to a given phrase. Each type judgement rule is of the form γ ⊢ ρ: τ type. This rule says that in type system γ, phrase ρ judged as security type τ ∈ {high, low}, with a phrase type of expression, set, or execution. Example rules for information flow in relational data.

E-BASE  γ ⊢ e: high

E-LOW  $\dfrac{h \notin attrs(e)}{\gamma \vdash e: \text{low}}$

E-SET  $\dfrac{E = \{e_1, \ldots, e_n\} \quad \forall i \in \{1 \ldots n\}: (\gamma \vdash e_i: \tau)}{\gamma \vdash E: \tau \text{ set}}$ Rules for information flow in relational data shows example labeling expressions and sets thereof. In rule e-base any phrase may be evaluated as high. An expression may be labelled as low if and only if none of the attributes referenced in it are high. In e-set the PDN 100 assigns a type to a set of expressions, E, by resolving its elements to a single label, τ. If E contains a mix of low and high expressions, the system uses type coercion to assign a high label to the set.

The type system rules for labeling relational algebra operators in a query plan are shown below. Each relational algebra operator can be classified into one of two categories: tuple-at-a-time or multi-tuple evaluation. Most tuple-at-a-time operators, or ones that emit output by considering each tuple discretely, have no need for secure evaluation unless they consume data from one or more secure children. Operators of this kind are scan, SQL project (for altering the attributes in intermediate results), limit, and filters with low predicates. As shown in r-filter, a filter needs to be evaluated obliviously if and only if its predicate changes the operator's output cardinality based on private attributes. Scans are unconditionally public because they are executed locally and their output cardinality is not altered by any attributes.

Multi-tuple operators-including sorts, joins, and set operations-combine data from multiple source engines, and they execute at the level of their most sensitive inputs. The type judgements of this kind are r-aggregate, r-distinct, r-join, r-setop, and r-sort. This, in conjunction with the nesting rules, ensure that these operators leak no information about private data.

All additional operators are covered by r-nest; it states that a new operator Op' executes at a security level greater than or equal to that of its child. In r-nest-bin, generalize this to operators with two inputs, e.g., joins and set operations. If a binary operator has at least one high child, then the operator is judged as high. The nesting judgements ensure that no subsequent operators leak information about a prior secure computation. Example typing system rules for information flow in relational algebra query tree.

R-AGGREGATE  $\dfrac{\gamma \vdash E: \tau \text{ set}}{\gamma \vdash agg(E): \tau \text{ exec}}$ R-DISTINCT  $\dfrac{\gamma \vdash E: \tau \text{ set}}{\gamma \vdash \text{distinct}(E): \tau \text{ exec}}$ R-FILTER  $\dfrac{\gamma \vdash \exp: \tau}{\gamma \vdash \sigma_{exp}(E): \tau \text{ exec}}$ R-JOIN  $\dfrac{\gamma \vdash E: \tau \text{ set} \quad \gamma \vdash E': \tau \text{ set}}{\gamma \vdash E \bowtie E': \tau \text{ exec}}$ R-SCAN  γ ⊢ scan(E): low exec R-SETOP  $\dfrac{\gamma \vdash E: \tau \text{ set} \quad \gamma \vdash E': \tau \text{ set}}{\gamma \vdash E \text{ op } E': \tau \text{ exec}}$ R-SORT  $\dfrac{\gamma \vdash E: \tau \text{ set}}{\gamma \vdash \text{sort}(E): \tau \text{ exec}}$ -continued $$R\text{-NEST} \frac{\gamma \vdash Op(\cdot):\ \tau\ exec \qquad \gamma \vdash Op'(\cdot):\ \tau\ exec}{\gamma \vdash Op'(Op(\cdot)):\ \tau\ exec}$$

$$R\text{-NEST-BIN} \frac{\gamma \vdash Op(\cdot):\ \tau\ exec \qquad \gamma \vdash Op'(\cdot):\ \tau\ exec \qquad \gamma \vdash Op''(\cdot):\ \tau\ exec}{\gamma \vdash Op''(Op(\cdot),\ Op'(\ )):\ \tau\ exec}$$

Security proof of information flow type system by induction. The type system traverses a query tree bottom-up.

Base Case: The leafs of the query tree are all table scans. By r-scan every branch of the tree begins as low. Table scans are unconditionally oblivious—the contents of the tuples do not alter the data flow of this operator.

Step 1: There are two cases for the parent operator of a scan. The operator may process data one tuple at a time. Recall that projects, limits, and low filters are in this category. By r-filter, the filter operator ceases to be oblivious when its predicate references non-public attributes. Otherwise, the filter executes at the same security level as its child by r-nest. Likewise, SQL project and limit operators are deterministic in the cardinality of their outputs, so they reveal no information that is not already visible from running them at the security of their source operator.

The remaining operators-aggregation, distinct, join, set operations, and sort-compute over multiple tuples. Thus, they may execute over the data of mutually distrustful data providers 108. Each of these operators executes at the security level of the most sensitive attribute in their input expressions. By e-set, the type system determines the security label of the expressions in an operator's fields. The resolver labels the operator with the set's security level, $\tau$, using the operator-specific rules above.

Step $\eta$: Each subsequent step executes at a security level greater than or equal to that of its children. By r-nest and r-nest-bin, an operator is typed with the label of its source nodes. Therefore, even if an operator only references public attributes, such as DISTINCT patient_id in recurrent c. diff, the plan reveals no information about the output of secure computation performed by its source operators.

Secure Query Optimization

Figure 4:
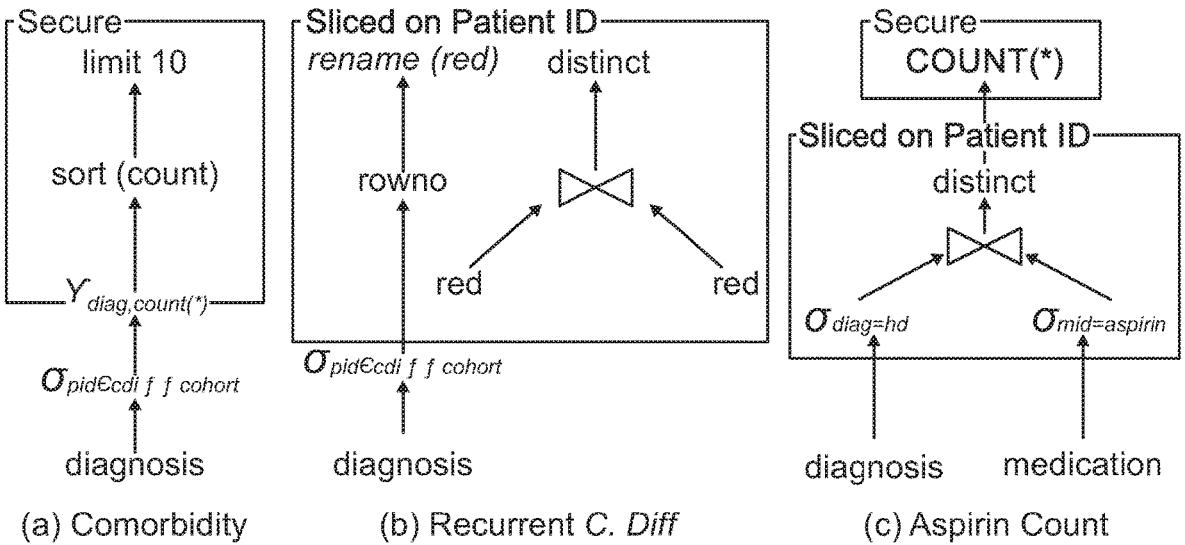
FIG. 4 are query trees of example optimized PDN query execution plans.

FIG. 4 are query trees of example optimized PDN query execution plans. Optimizations to improve the performance of smcql for secure querying can begin with a secure query plan, where each operator is labelled high or low using the checker. It then transforms this logical plan into a low-level physical one. Using heuristics, smcql reduces a secure plan's use of secure computation and partitions query evaluation into small, scalable units. The optimizations described below are generalizations of distributed query optimization.

Scalable Physical Plans

The optimizer identifies opportunities to slice its secure query evaluation by partitioning the input data into smaller, more manageable units of computation. This fine-grained partitioning enables us to reduce secure code complexity, thereby speeding up the secure computation of eligible queries. Slicing also makes it possible to parallelize secure query evaluation. The optimizer assigns each operator in a secure plan to one of three execution modes:

Plain: Operators are of type low and they evaluate in the source database.

Sliced: High operators run securely over tuples that are horizontally partitioned by a public expression.

Secure: High operators executed using a single SMC program run on the inputs of all data providers.

All paths in the tree start with plaintext scans over a database table. When the executor encounters a high operator, the engine switches to sliced or secure execution mode. If an operator is in sliced mode, then its ancestors must run in sliced or secure mode so that the query's computation remains oblivious.

Each sliced operator that receives plaintext data bins its input by a slice key, or an expression on public attributes upon which the engine divides up a secure operator's computation. Each distinct value associated with a slice key, or slice partition, is computed independently. For each relational algebra operator in Grammar 1, it can be identified if and how it is sliceable.

Joins with public predicates are runnable one slice partition at a time. Likewise, it is possible to slice sorts by all or part of their sort key. Sliced aggregates compute one group—by bin at a time and DISTINCT operators break up their computation by the attributes they reference. Since filters and projections work one tuple at a time, they are agnostic to slicing and assume the slice key of their parent or child operator, whichever enables more sliced evaluation. Set operations with any slice key produce the correct outputs because a non-empty key guarantees that any tuples needing comparison are grouped together.

Slicing is a powerful optimization for the PDN 100 because it is composable. The optimizer identifies sequences of secure operators that partition their computation on the same slice key. For example, in the recurrent c. diff query every operator after its initial table scan is computed securely and all oblivious operators are sliced by patient ID. For assigning execution mode to database operators in a secure query plan, the optimizer identifies sequences of sliced computation by traversing a query tree bottom-up.

```
Function planExecution
Input: DatabaseOperator o
Output: ExecutionMode e ∈ {Plain, Sliced, Secure}
e = Plain;
if o.label = low then
    return e;
end if
for c ∈ o.children( ) do
    childMode = planExecution(c);
    if childMode == Secure then
        e = Secure;
    else if childMode == Sliced then
        if o.sharesSliceKey(c) and e ≠ Secure then
            e = Sliced;
        else
            e = Secure;
        end if
    end if
end for
// if o.label = high and all children computed in plaintext
if e == Plain and o.sliceKey ≠ Ø then
    e = Sliced;
else
    e = Secure;
end if
return e
```

All low operators are run in plaintext. If a high operator has only plain children and a nonempty slice key, then it is assigned to slice mode. The optimizer then checks to see if the operator shares a slice key with its parent. Two operators are sliced alike if their slice key is equal, or for joins, at least one side of an equality predicate appears in the slice key of each of its descendants. If a high operator does not qualify for slicing, the PDN 100 can switch to secure mode.

Security Proof: Each sliced query evaluation is equivalent to running a secure operator without slicing where the PDN 100 inserts a filter over public attributes for each distinct slice partition. The optimizer identifies partitions of computation by running SELECT DISTINCT <slice key> FROM . . . on each data provider. By r-distinct this query is public. After that, the PDN 100 evaluates each slice partition securely using the previous plan with an added filter for each slice partition. By r-filter this filter is public, the PDN 100 retains the security properties of the previous plan.

Minimizing Secure Computation

The PDN 100 can utilize other optimizations to reduce a query's use of secure computation. The first delays its entry into SMC by partially computing an operator in a lower execution mode. The second reduces the data that the engine evaluates securely.

Split Operators: A splittable operator may partition its execution into discrete phases, such as local plaintext followed by distributed secure computation. For example, if the PDN 100 is computing a COUNT(*), the query executor may have each data provider calculate a local partial count and use SMC to add them up. Aggregates and filters are splittable operators.

Each split-able operator can include a low phase and a high phase, and the low phase is executed first. For aggregates, the low phase partially computes the aggregate over the input tuples and the high one combines the partial aggregates. Filters with conjunctive predicates are split-able into clauses that reference sensitive attributes and ones that do not. All other operators are not trivially split-able.

Security Proof: For an aggregate with no group—by its output is exactly one tuple, and it is trivially oblivious. To handle aggregates with a group—by on sensitive attributes, the PDN's 100 architecture to can reduce overhead. The data providers 108 do not reveal protected or private attributes to one another and that none of the data providers have access to the output of a secure query evaluation. If an operator computes over |A| partial aggregates from Alice 108a and |B| from Bob 108b, the output cardinality of its high phase is unconditionally |A|+|B| with null-padding as needed. The fixed output length precludes each data provider from learning the group—by values of a partial aggregate that is not their own. A split filter is analogous to creating two separate selections, one for low predicates followed by another for high ones. The PDN 100 performs a type judgement on each one with r-filter and assign its execution mode accordingly.

Secure Semi-Join: the PDN 100 can further reduce reliance on secure computation by performing it only on slice partitions that are present in greater than one data provider. For example, in recurrent c. diff if a given patient ID is present in just one hospital, the PDN 100 evaluates the medical records of this individual locally in plaintext, sending the output of this computation to the honest broker 106 over an encrypted channel. Hence, the query execution plan has two tracks for sliced operators: a secure one for partitions that appear in multiple data providers and plaintext one for all others.

Security proof: To determine the distributed slice partitions, the honest broker 106 collects the distinct slice partitions. The honest broker 106 then takes the intersection of their sets. By r-setop the computation of an intersection of two public inputs is public. By using only public values in slice keys, this optimization reveals no additional information in comparison to its predecessors.

Optimized Plans

Comorbidity starts by executing the diagnosis scan in plaintext on each host, filtering its input tuples for ones in the c. diff patient registry. Since this query's slice key is the diagnosis code, a protected attribute, its execution cannot be trivially partitioned. Next, it performs a split aggregate, wherein each host computes a partial diagnosis count for each condition locally. Each site feeds its partial counts into a single unit of secure computation and the data providers 108 work together to sum up their counts for overlapping diagnoses, sort them, and take the most common ones.

Recurrent c. diff runs almost entirely in sliced mode. The filter, its first high operator, checks for an infection diagnosis. It takes on the slice key of its parent, a window aggregate partitioned on patient ID. The window aggregate numbers the infection diagnoses of each patient, where the diagnoses are sorted on timestamp. The PDN 100 then self-joins this table one patient at a time to identify the ones with a recurring diagnosis, and eliminate duplicates using the same slice key.

Aspirin count begins in plaintext with scans on the medication and diagnosis tables. Next, the PDN 100 filters on a protected attribute, and this step is sliced on patient ID. The PDN 100 then joins the two tables to identify heart disease patients who received an Aspirin prescription. After that, the PDN 100 eliminates duplicate patient IDs one slice at a time. Finally, the PDN 100 switches to secure mode to count up the patient IDs over all slices.

The PDN 100 can optimize use of secure computation in at least three ways. First, smcql horizontally partitions the data over public attributes to reduce the time and complexity of the oblivious computing. Second, the query evaluator splits up query operators to prolong its time in a less expensive execution mode. The optimizer identifies tuples that do not require distributed secure computation and evaluates them within their source DBMS.

Example Setup

The PDN 100 evaluates smcql on medical data from two Chicago-area hospitals in the HealthLNK data repository over one year of data. In some examples, the dataset has 500,000 patient records, or 15 GB of data. The PDN 100 uses a public patient registry for common diseases that maintains a list of anonymized patient identifiers associated with these conditions. The PDN 100 filters the query inputs using this registry.

smcql's query executor is built atop PostgreSQL 9.5 running on Ubuntu Linux.

The PDN 100 evaluated the two-party prototype on eight servers running in pairs. The servers each have 64 GB of memory, 7200 RPM NL-SAS hard drives, and are on a dedicated 10 Gb/s network. Results report the average of three runs per example. Unless otherwise specified, the example results show the end-to-end runtime of a query, including its plaintext and secure execution. All figures display their runtimes on a logarithmic scale.

Secure Query Optimization

The role of smcql's optimizations in making PDN 100 queries run with efficiency and scalability can be examined. The results in some examples are from query executions over samples of HealthLNK data with 50 tuples per data provider. The samples can be taken uniformly at random, with the restriction that each sample has at least one distributed slice partition so that the query uses secure computation.

The PDN 100 uses a baseline of fully secure execution with no optimizations. This test is analogous to a query execution where all of the attributes in a PDN's schema are protected. The second approach, SMC minimization, evaluates optimizations that reduce the subtree of a query's plan that is executed securely and the data processed therein. For comorbidity, this tests split operators. In aspirin count and recurrent c. diff, it showcases the secure semi-join. The PDN 100 measures the system's performance when fully optimized. These results show the system performance with the previous optimizations plus sliced execution.

Figure 5:
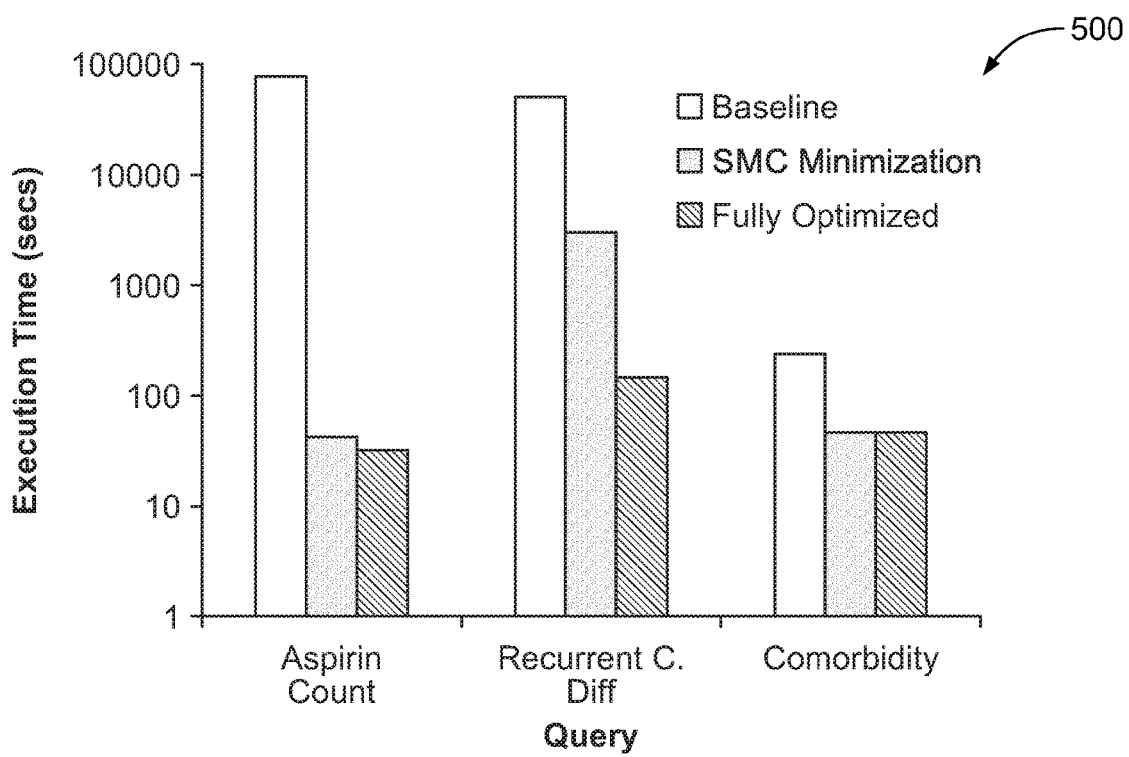
FIG. 5 is a graph of an example PDN performance on sampled data.

FIG. 5 is a graph 500 of an example PDN 100 performance on sampled data. FIG. 5 displays the runtime for each query end-to-end. The baseline execution can be slow, even for modest data sizes. Leveraging the PDN's 100 security policy can be important for efficient query evaluation in this setting. The SMC minimization techniques substantially improve the system's performance for all queries. With the split operator evaluation, comorbidity runs 5× faster than the baseline. The query has no sliced operators, so it realizes no additional speedup in the fully optimized test.

There can be a performance improvement from aspirin count. The secure semi-join heuristic substantially reduces the number of tuples processed in this query and it has a speedup of 1700× over the baseline. This query benefits less from sliced execution because its tuples are not evenly distributed over the slice partitions. This skewed distribution reduces the effectiveness of slicing because its largest partitions are comparable in size to the single partition run in the SMC minimization example.

In contrast, recurrent c. diff's SMC minimization has a less pronounced improvement of 17× over the baseline. This query has fewer opportunities for optimization because its plan has a simpler tree of operators in comparison to aspirin count. On the other hand, recurrent c. diff responds better to slicing owing to its tuples having an even distribution over the query's partition keys. Its fully-optimized version is nearly 350× faster than the baseline.

Figure 6:
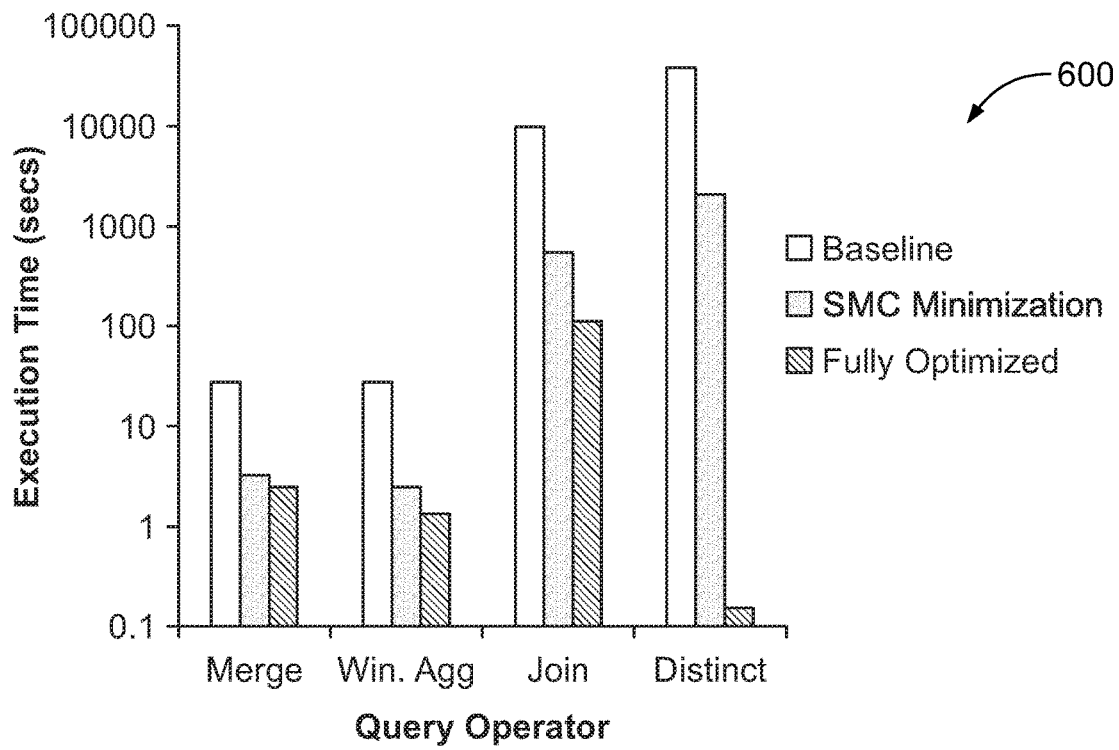
FIG. 6 is a graph of an example optimized performance of recurrent c. diff.

FIG. 6 is a graph 600 of an example optimized performance of recurrent c. diff. smcql's optimizations can improve the performance of recurrent c. diff. An example breakdown of this query's runtime is shown on each of its secure operators. A gradual performance improvement can occur as more optimizations are added. The merge and window aggregate operators both make simple passes over the data, and their oblivious runtimes are proportional to the size of their inputs. The un-optimized join can be costly because it computes the cross product of its input relations. The DISTINCT operator has a SMC-induced performance penalty owing to its large input from the exhaustive join.

Secure semi-join noticeably improves the performance of each operator. By reducing the cardinality of the secure input data, the first two operators run faster. This is primarily owing to the reduced I/O costs associated its oblivious memory accesses on smaller arrays of data. The join shows a reduction in runtime due to its performing fewer tuple comparisons. Likewise, the final distinct operator has a strong performance improvement over the baseline owing to its smaller input data.

Slicing bolsters the performance of the recurrent c. diff query. Building multiple small oblivious tuple arrays speeds up the data ingest. Window aggregate enjoys even greater gains since slicing partitions the data by its group—by clause-further simplifying its secure code. The join also becomes faster because it is computing the cross product over fewer tuples. The cost of finding the distinct patient IDs goes to less than a second because each slice partition simply checks if it has a non-empty array of tuples.

System Scale Up smcql can be tested as it scales to larger input data. In one example, the comorbidity query is executed. The size of the SMC input, the partial counts of comorbid conditions in the c. diff cohort, are limited to 100, 200, and 400 tuples for the example. The examples includes nearly 800 diagnosis codes with each party supplying around 650 partial counts. Runtimes are reported in milliseconds.

Figure 7:
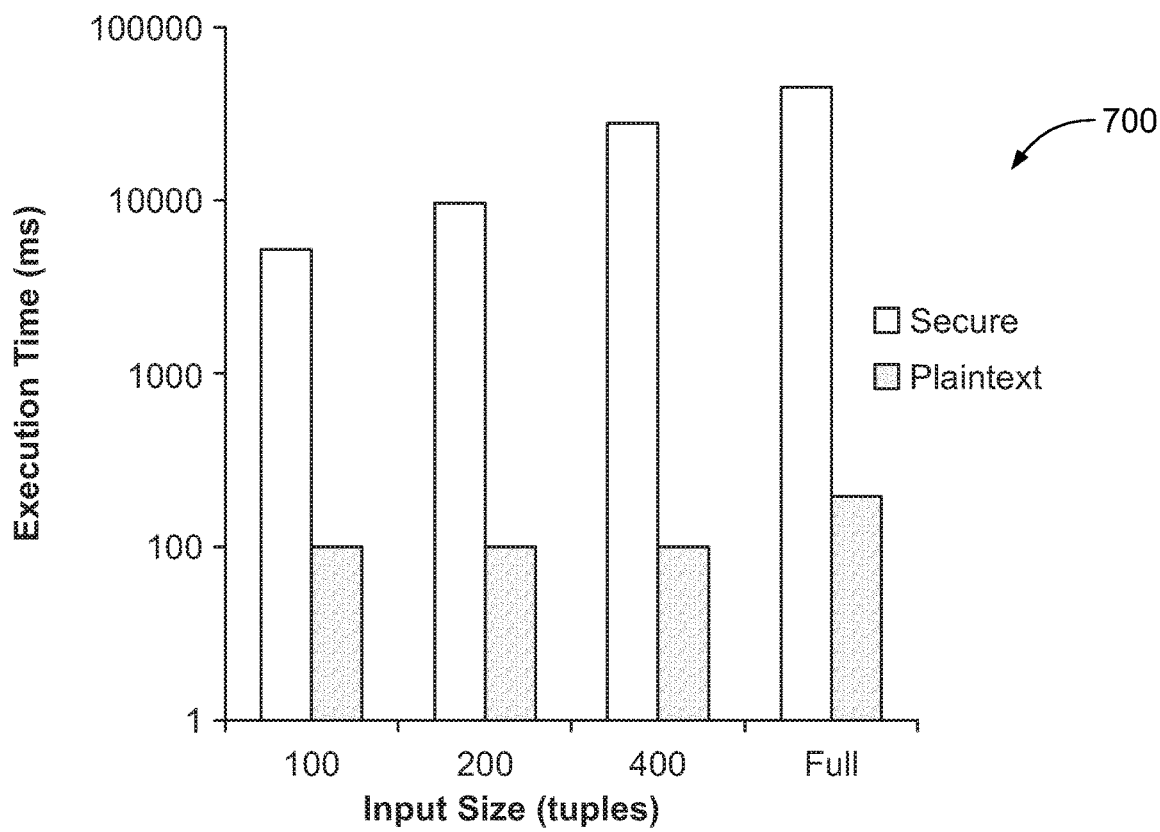
FIG. 7 is a graph of an example runtime of comorbidity on increasing data sizes.

FIG. 7 is a graph 700 of an example runtime of comorbidity on increasing data sizes. FIG. 7 illustrates example scale up results. The plaintext execution time of this query grows slowly as the PDN 100 scales up. The dominant cost of plaintext comorbidity is in local computing, wherein it scans each table, filters for the cohort, and computes the local partial count.

In contrast, comorbidity's secure execution shows an increase in duration as the framework computes over more data. This is primarily caused by increasing costs associated with larger oblivious tuple arrays instances for storing and accessing the data. Because the secure array shuffles the data every time an element is accessed, its cost increases in proportional to its input size. In addition, the query execution takes longer because its secure operators perform more comparisons among the inputs to sum up partial counts.

The smallest scale run in this analysis has a slowdown of 2,700× in comparison to its plaintext execution. With an input size of 400 tuples, the query's duration jumps to nearly 74,000× its conventionally executed counterpart. When the PDN 100 is run over the entire SMC input, runtime goes to 6.5 hours or 56,000× the baseline.

Figure 8:
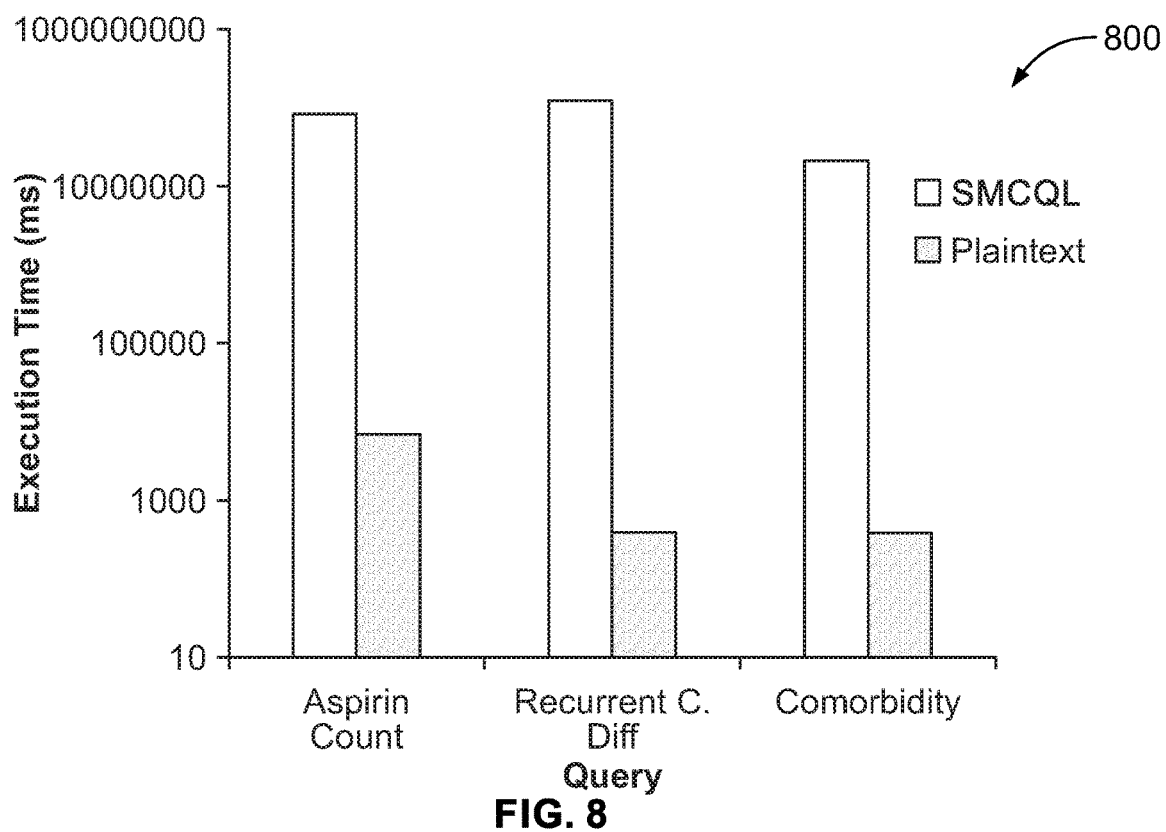
FIG. 8 is a graph of an example runtime on full year of HealthLNK records.

FIG. 8 is a graph 800 of an example runtime on full year of HealthLNK records. Zooming out to look at the PDN 100 end-to-end performance, the effects of its entire query optimization system can be apprised. For this example, a full year of health records can be used. Results are shown in FIG. 8. These results are a scaled-up evaluation of the fully optimized test in FIG. 5. All of these queries run 5-6 orders of magnitude more slowly than their plaintext counterparts. smcql executes recurrent c. diff in 37 hours, aspirin count in 23 hours, and comorbidity in 6 hours. These queries are accessing a collective 42 million diagnoses and 23 million medication records. By using fine-grained partitions of the underlying dataset, the SQL operators scale reasonably to large volumes of data.

Higher runtimes for aspirin count and recurrent c. diff. can be seen. Both of these take upwards of a single day to run. The primary source of the slowdown arises from their join operators that have hundreds of input tuples and they perform $O(n^2)$ comparisons for oblivious evaluation. One solution for scaling smcql to large datasets is to partition the work into smaller units and use the honest broker to assemble the results. This approach can include an analytical cost model to identify how finely to partition based on the rate at which the honest broker 106 can accept and assemble the final results. A planner can analyze the cardinality of intermediate results to ensure that the honest broker does not receive unauthorized access to protected or private attributes. In a running example, this may mean ensuring that intermediate results received by the honest broker were k-anonymous in their protected attributes and had no private data.

Example results demonstrate that smcql provides practical secure query evaluation over SQL for mutually distrustful data providers 108. Joins are the most costly oblivious operator and that their large output cardinalities impact the execution time of their parent operators. Slicing reduces the slowdown associated with secure query execution, and it is effective for datasets where the tuples are evenly partitioned over the slice key space. Example results show that query runtime grows rapidly as the system scales up to larger datasets.

Several approaches to secure query processing exist in the literature. Most of this work is designed for outsourced computation. In contrast, a PDN 100 keeps query processing in the database as much as possible and performs SMC within the hosts from which the data originated. This enables data providers 108 who do not trust the cloud (or some other third party) to share information. By partitioning query processing at a fine granularity, usable performance can be provided for complex PDN 100 workloads.

Figure 9:
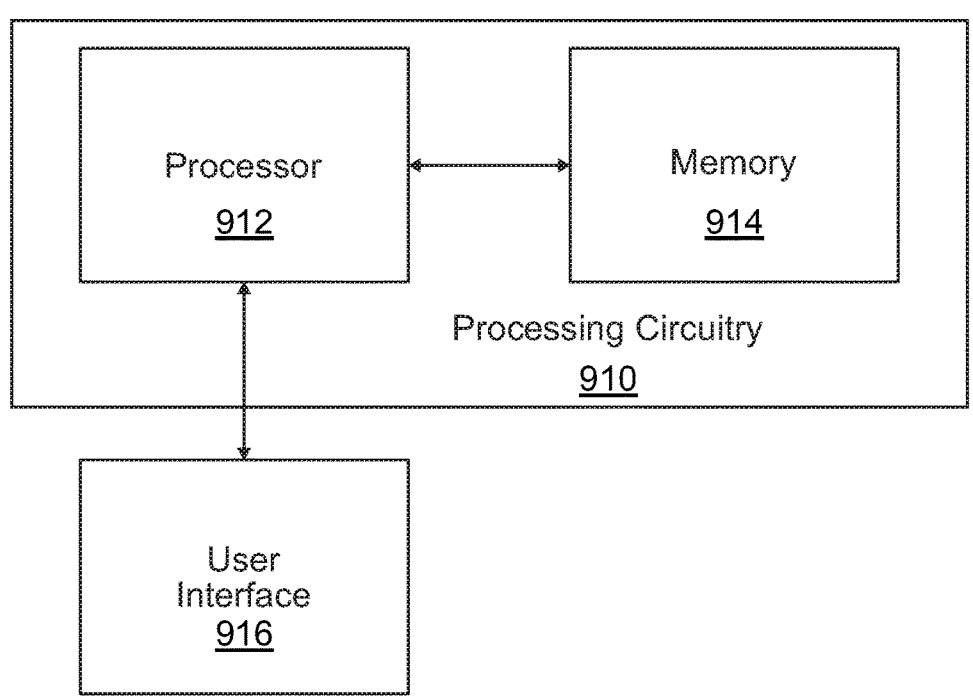
FIG. 9 is a block diagram of an example computing device.

FIG. 9 is a block diagram of an example computing device 900. The systems and methods described above may be implemented in many different ways in many different combinations of hardware, software firmware, or any combination thereof. In one example, the computing device 900 may be implemented in one or more of the computer cluster 102, the data providers 108, the honest broker 106 and the user computer 104. It will be appreciated that the components, devices or elements illustrated in and described with respect to FIG. 9 below may not be mandatory and thus some may be omitted in certain embodiments. Additionally, some embodiments may include further or different components, devices or elements beyond those illustrated in and described with respect to FIG. 9.

In some example embodiments, the computing device 900 may include processing circuitry 910 that is configurable to perform actions in accordance with one or more example embodiments disclosed herein. In this regard, the processing circuitry 910 may be configured to perform and/or control performance of one or more functionalities of the secure databases. The processing circuitry 910 may be configured to perform data processing, application execution and/or other processing and management services according to one or more example embodiments. In some embodiments, the computing device 900 or a portion(s) or component(s) thereof, such as the processing circuitry 910, may include one or more chipsets and/or other components that may be provided by integrated circuits.

In some example embodiments, the processing circuitry 910 may include a processor 912 and, in some embodiments, such as that illustrated in FIG. 9, may further include memory 914. The processor 912 may be embodied in a variety of forms. For example, the processor 912 may be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 912 may comprise a plurality of processors. The plurality of processors may be in operative communication with each other and may be collectively configured to perform one or more functionalities of the computing device 900 as described herein. In some example embodiments, the processor 912 may be configured to execute instructions that may be stored in the memory 914 or that may be otherwise accessible to the processor 912. As such, whether configured by hardware or by a combination of hardware and software, the processor 912 is capable of performing operations according to various embodiments while configured accordingly.

In some example embodiments, the memory 914 may include one or more memory devices. Memory 914 may include fixed and/or removable memory devices. In some embodiments, the memory 914 may provide a non-transitory computer-readable storage medium that may store computer program instructions that may be executed by the processor 912. In this regard, the memory 914 may be configured to store information, data, applications, instructions and/or the like for enabling the computing device 900 to carry out various functions in accordance with one or more example embodiments. In some embodiments, the memory 914 may be in communication with one or more of the processor 912, the user interface 916 for passing information among components of the computing device 900.

While various embodiments have been described, it can be apparent that many more embodiments and implementations are possible. Accordingly, the embodiments are not to be restricted.

We claim:

1. A system, comprising:
a computing device configured to query data from at least two untrusting data providers;
a server configured to translate the query into a plurality of secure multiparty computing primitives;
transmit the plurality of secure multiparty computing primitives to the at least two untrusting data providers;
where the plurality of secure multiparty computing primitives generates secure functions to obfuscate query computations without obfuscating rendered portions of the query data provided by the at least two untrusting data providers,
wherein the at least two untrusting data providers encode a union of the rendered portions of the query data before the at least two untrusting data providers jointly compute the query computations by creating secret shares of the rendered portions of the query data, wherein the secret shares of the rendered portions of the query data are indistinguishable from a random number prior to combining of the rendered portions;
receive the rendered portions of the query data from the at least two untrusting data providers;
combine the rendered portions of the query data according to the query computations to form a query response; and
transmit the query response to the computing device.

2. The system of claim 1, where the at least two untrusting data providers at the server further includes oblivious random-access memory, where the server is configured to store the data in the oblivious random access memory.

3. The system of claim 2, where the secure functions include a series of logic gates configured to obfuscate the query computation.

4. The system of claim 3, where the secure functions are configured to hide an execution trace of computing of the data.

5. The system of claim 3, where the server is configured to encode inputs for a function using an oblivious transfer.

6. The system of claim 2, where the at least two untrusting data providers generate the secure functions.

7. The system of claim 6, where the server is connected with the at least two untrusting data providers, where outputs of the secure functions are returned to the server.

8. The system of claim 7, where the server produces a plaintext query result for the computing device.

9. The system of claim 7, where the secure multiparty computing primitives do not reveal sensitive information about tuples to the at least two untrusting data providers and the server.

10. The system of claim 9, further including oblivious random access memory to store the tuples.

11. The system of claim 1, where the query comprises a SQL query.

12. A method, comprising:
receiving, by a processor of a server, a query to analyze data from at least two untrusting data providers;
translating, by the processor, the query into a plurality of secure multiparty computing primitives;
transmitting the plurality of secure multiparty computing primitives to the at least two untrusting data providers;
where the plurality of secure multiparty computing primitives generates secure functions to obfuscate query computations without obfuscating rendered portions of the query data provided by the at least two untrusting data providers,
wherein the at least two untrusting data providers encode a union of the rendered portions of the query data before the at least two untrusting data providers jointly compute the query computations by creating secret shares of the rendered portions of the query data, wherein the secret shares of the rendered portions of the query data are indistinguishable from a random number prior to combining of the rendered portions;
receiving the rendered portions of the query data from the at least two untrusting data providers; and
combining the rendered portions of the query data according to the query computations to form a query response.

13. The method of claim 12, further comprising the at least two untrusting data providers storing the data in an oblivious random-access memory.

14. The method of claim 12, further comprising hiding an execution trace of computing of the data.

15. The method of claim 12, further comprising encoding inputs for a function using an oblivious transfer.

16. The method of claim 12, further comprising returning the outputs of the secure functions to the server.

17. The method of claim 12, further comprising producing a plaintext query result.

18. The method of claim 12, further comprising not revealing sensitive information about tuples to the at least two untrusting data providers and the server.

19. The method of claim 18, further including storing the tuples in oblivious random-access memory.

20. The method of claim 12, where the query comprises a SQL query.

* * * * *